United States Patent [19]

Kalpathi

[11] Patent Number: 5,786,681
[45] Date of Patent: Jul. 28, 1998

[54] ACTIVE PHASE COIL INDUCTANCE SENSING

[75] Inventor: Ramani R. Kalpathi, Ann Arbor, Mich.

[73] Assignee: Dana Corporation, Toledo, Ohio

[21] Appl. No.: 749,461

[22] Filed: Nov. 15, 1996

[51] Int. Cl.$^6$ ....................................................... H02P 1/46
[52] U.S. Cl. ........................... 318/701; 318/254; 318/138; 318/439; 318/798.815; 318/599
[58] Field of Search ........................ 318/701, 254, 318/138, 439, 798–815, 599

[56] References Cited

U.S. PATENT DOCUMENTS

| Re. 35,124 | 12/1995 | Erdman et al. | 318/599 |
|---|---|---|---|
| 4,611,157 | 9/1986 | Miller et al. | 318/696 |
| 4,707,650 | 11/1987 | Bose | 318/685 |
| 4,739,240 | 4/1988 | MacMinn et al. | 318/696 |
| 4,777,419 | 10/1988 | Obradovic | 318/696 |
| 4,928,049 | 5/1990 | Pietrobon et al. | 318/685 |
| 5,006,772 | 4/1991 | Danby | 318/696 |
| 5,012,171 | 4/1991 | Sember | 318/696 |
| 5,012,172 | 4/1991 | Sember | 318/696 |
| 5,072,166 | 12/1991 | Ehsani | 318/696 |
| 5,084,663 | 1/1992 | Olsson | 318/701 |
| 5,097,190 | 3/1992 | Lyons et al. | 318/701 |
| 5,116,591 | 5/1992 | Stephens et al. | 318/701 |
| 5,247,235 | 9/1993 | Tu et al. | 318/685 |

OTHER PUBLICATIONS

"New Commutation Methods in Switched Reluctance Motors Based on Active Phase Vectors," K.R. Ramani and M. Ehsani, 25th Annual IEEE Power Electronics Specialists Conference, vol. 1, 1994, pp. 493–499 (20–25 Jun. 1994).

*Primary Examiner*—Karen Masih
*Attorney, Agent, or Firm*—Dykema Gossett PLLC

[57] ABSTRACT

A method and circuit are disclosed for commutating a conduction cycle of a motor phase of a switched reluctance motor having a rotor portion thereof. The circuit includes a first switching device and a second switching device connected in series with a phase coil. A microcontroller closes both switching devices to connect the coil across a power supply to thereby initiate a conduction cycle. When a current level in the phase coil reaches a threshold level, only one switching device is modulated to control the current level between a local minimum level and a local maximum level. Rise and fall times of the current level between the local minimum and maximum levels are measured and an active phase time ratio is calculated using the rise and fall times. When the ratio, which is indicative of an angular position of the rotor in the switched reluctance motor, reaches a predetermined threshold value, the conduction cycle is commutated.

17 Claims, 3 Drawing Sheets

ACTIVE PHASE COIL INDUCTANCE SENSING

BACKGROUND OF THE INVENTION

1. Field of the Invention

This invention relates in general to switched reluctance motors and more particularly to a method and circuit for determining a commutation time of a conduction cycle of a motor phase of a switched reluctance motor.

2. Discussion of Related Art

In a switched reluctance motor (SRM), a pair of diametrically opposed stator poles produce a torque in order to attract a pair of corresponding rotor poles into alignment with the stator poles. This torque thus produces movement in a rotor of the SRM. The SRM may have one more pair of stator poles than rotor poles with the stator poles and the rotor poles spaced such that only one pair of stator poles can be aligned with any one pair of rotor poles at any given time.

Torque is produced by generating a current through a winding or coil located on a stator pole. In one configuration, windings around any two diametrically opposed stator poles are connected in series or in parallel to define one motor phase of the multiphase SRM. The windings associated with a motor phase may be referred to as a phase coil. The current in the phase coils is generated in a predetermined sequence in order to produce a constant torque on the rotor. Once a pair of rotor poles has become aligned with a first pair of stator poles, or even as the pair of rotor poles approaches the first pair of stator poles, it is desirable to interrupt the current in the phase coil surrounding the first pair of stator poles so that the rotor poles can continue moving towards a second pair of stator poles without being restricted by a negative, or braking torque produced by current flowing in the winding of the first pair during a negative-slope inductance interval of the winding.

Conventional methods have determined a commutation time based on the position of the rotor relative to the stator. Some methods have determined the position of the rotor directly through the use of devices such as resolvers or encoders which are mounted directly on the motor shaft. These methods have the disadvantage of being fairly complicated and expensive (due to the extra hardware required).

Another group of conventional methods determine the position of the rotor indirectly by sensing the variation in inductance of each phase coil as the rotor changes position (relative to each pair of stator poles). While progress has been made using these methods, they still suffer generally from less than desired accuracy under various motor speed and load levels. In addition, many of these methods require the performance of complex mathematics, such as real time integration, and thus require additional hardware.

There is thus a need to provide a system for indirectly sensing the angular position of the rotor, and thus the proper commutation time of a conduction cycle of a motor phase, that eliminates or minimizes one or more problems as set forth above.

SUMMARY OF THE INVENTION

The present invention provides a system for determining the commutation time of a conduction cycle of a motor phase of a switched reluctance motor (SRM) through indirect sensing of an angular position of a rotor. Such a determination is desirable to produce a relatively constant torque. This invention employs "active phase coil sensing" (i.e., it operates by sensing changes in the observed inductance in the torque-producing phase coils of an SRM). The "active phase coil sensing" approach permits determination of the angular position of the rotor by using simple mathematical calculations, and is not limited, as other conventional techniques are, by the requirement of performing real-time integration. Moreover, this invention reduces switching losses relative to known structures by opening only one of two switches to maintain the current level in the phase coil within the predetermined current band.

In a preferred embodiment, a method is provided for use with an SRM having a plurality of motor phases. The method includes several basic steps. The first step involves simultaneously closing the first and second switching devices of a motor phase to thereby initiate a conduction cycle. During this cycle, current flows through the phase coil. Next, a selected one of the switching devices is repeatedly opened and closed, while the other switching device remains closed, to thereby modulate the current level in the phase coil between a local maximum level and a local minimum level. Next, two times are measured: a rise time as measured by the time it takes the current level to rise from the local minimum level to the local maximum level; and a fall time as measured by the time it takes the current level to fall from the local maximum level to the local minimum level. An active phase time ratio value is then calculated using the rise and fall times and is then compared to a predetermined threshold value. If the ratio has not reached the threshold value, the modulation of the selected switching device continues and the measurement of rise and fall times and calculation of the ratio are repeated. When the ratio reaches the threshold value, the phase current is commutated by opening both the first and second switching devices.

The present invention, by using indirect sensing of the position of the rotor to control commutation of the motor phases, reduces the need for expensive, space-consuming hardware. As compared to other indirect sensing techniques, however, the present invention represents an improvement because it enables the rotor position to be determined by using less complex mathematics and by reducing power consumption through reduced switching losses. Reduced switching losses result from the ability to control the current level in the phase coil by opening and closing only one of the first and second switching devices as opposed to both.

These and other features and objects of this invention will become apparent to one skilled in the art from the following detailed description and the accompanying drawings illustrating features of the invention by way of example.

DETAILED DESCRIPTION OF THE PREFERRED EMBODIMENT

Figure 1:
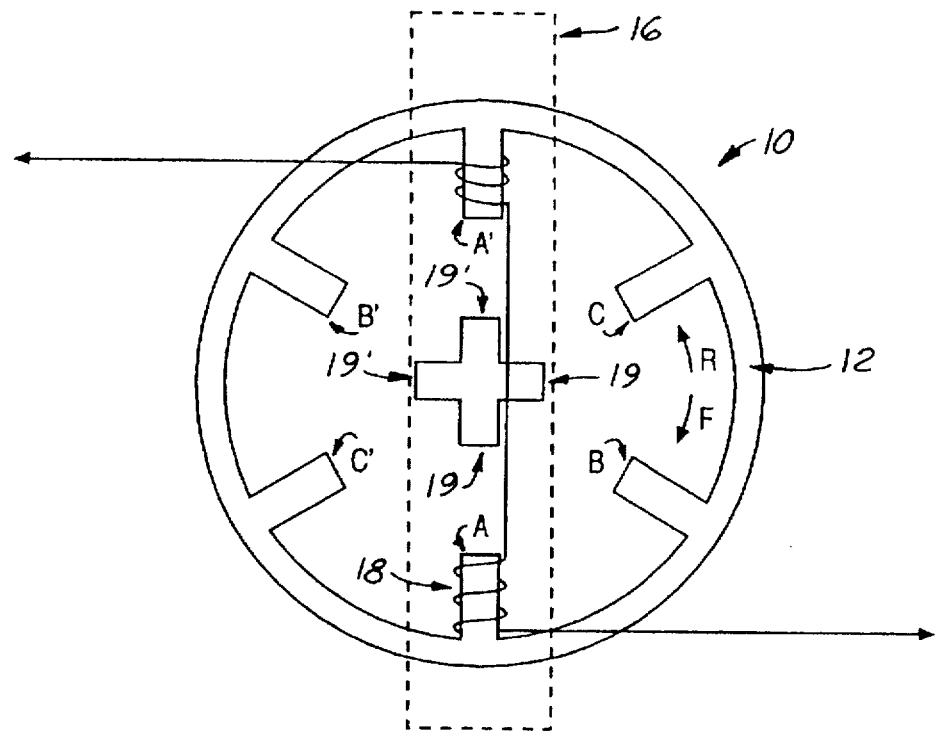
FIG. 1 is a simplified cross-sectional view of a stator and rotor portion of an exemplary three-phase switched reluctance motor.

Referring now to the drawings wherein like reference numerals are used to identify identical components in the various views, FIG. 1 shows a switched reluctance motor (SRM) 10. SRM 10 includes a stator 12 and a rotor 14. Stator 12 includes a plurality of diametrically opposed stator pole pairs A-A', B-B', and C-C'. A representative motor phase 16 is indicated by a dashed-line box, while the other two motor phases are not shown. Although it will be understood to those skilled in the art that SRM 10 could have any number of motor phases 16, SRM 10 in FIG. 1 is shown having three motor phases 16. Windings on opposed stator poles, in the illustrated embodiment, may be connected in series to form a respective phase coil. A representative phase coil 18 is shown around stator pole pair A-A'. The phase coils around stator pole pairs B-B' and C-C' are not shown.

Rotor 14 includes a plurality of rotor pole pairs 19-19'. It will be understood to those skilled in the art that rotor 14 could have any number of rotor pole pairs. Rotor 14 is capable of both clockwise and counter-clockwise rotation. In FIG. 1, the forward direction F indicates clockwise rotation while the reverse direction R indicates counter-clockwise rotation.

Rotation of rotor 14 is produced by initiating, and later commutating, in a predetermined sequence, conduction cycles in each of the phase coils 18. As one of the phase coils 18 begins to conduct current, the nearest rotor pole pair is magnetically attracted towards the stator pole pair around which the energized phase coil 18 is wound. By initiating and commutating conduction cycles in phase coils 18 surrounding consecutive stator pole pairs, a relatively constant torque can be produced in either direction, F or R, of rotation.

Figure 2:
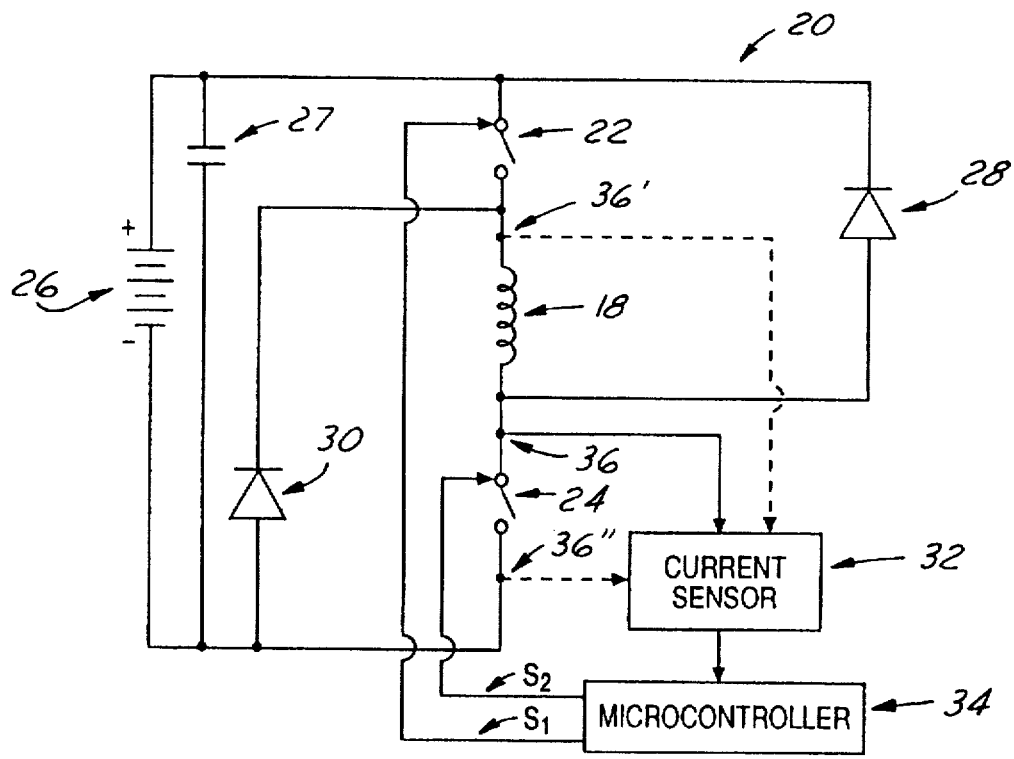
FIG. 2 is a simplified schematic and block diagram view of one motor phase of the switched reluctance motor according to the present invention.

FIG. 2 shows an equivalent circuit 20 of one motor phase 16 of SRM 10. Circuit 20 is provided to initiate, control, and commutate a conduction cycle in phase coil 18. Circuit 20 includes phase coil 18, a first switching device 22, a second switching device 24, a power supply 26, a capacitor 27, a first diode 28, a second diode 30, means, such as a current sensor 32, for monitoring a current level in phase coil 18, and means, such as a microcontroller 34, for opening and closing first and second switching devices 22, 24 to control a current level in phase coil 18, for measuring rise times and fall times of the current level in phase coil 18 and for comparing an active phase time ratio value based on the rise and fall times to a predetermined threshold value.

First switching device 22 and second switching device 24 are controlled to vary a level of current through phase coil 18. Both first switching device 22 and second switching device 24 are connected in series with phase coil 18. First switching device 22 and second switching device 24 are common in the art and may take any of a plurality of forms well known in the art. For example, devices 22, 24 may comprise MOSFET power devices.

Power supply 26 establishes a substantially fixed, predetermined voltage potential between its rails, and sources current to circuit 20, and in particular, to phase coil 18. Power supply 26 is connected in parallel with the combination of first switching device 22, phase coil 18, and second switching device 24. Power supply 26 is also well known in the art and may take any one of the plurality of well-known forms.

Capacitor 27, first diode 28 and second diode 30 are provided to recharge power supply 26 when first switching device 22 and second switching device 24 are opened. Capacitor 27 is connected in parallel with power supply 26. First diode 28 is connected in parallel with the combination of first switching device 22 and phase coil 18. Second diode 30 is connected in parallel with the combination of second switching device 24 and phase coil 18. When first and second switching devices 22, 24 are opened, the energy in phase coil 18 free-wheels through first and second diodes 28, 30 and recharges capacitor 27. Capacitor 27, first diode 28 and second diode 30 may take any one of the plurality of forms well-known in the art.

Current sensor 32 is provided to monitor the current level in phase coil 18. In one embodiment of the present invention, current sensor 32 is a Hall sensor. Current sensor 32 is connected to a node 36 that, in the illustrated embodiment, is located between phase coil 18 and second switching device 24. Alternatively, as indicated by the dashed lines, current sensor 32 could be connected to node 36' located between first switching device 22 and phase coil 18 or to node 36' located between second switching device 24 and the negative terminal of power supply 26, with equivalent operation. Current sensor 32 monitors the current level in phase coil 18 and generates a current signal indicative of the current level through phase coil 18. A plurality of current sensing devices are also well-known in the art and current sensor 32 may take any of these forms.

Microcontroller 34 is responsive to the current indicative signal generated by current sensor 32 and is provided to control the current level in phase coil 18. Microcontroller 34 controls the current level by generating control signals $S_1$ and $S_2$ to open and close first and second switching devices 22, 24, respectively. Microcontroller 34 includes memory and a counter and is controlled by a first set of program steps (i.e. software) which may exist independently of microcontroller 34 or be programmed into microcontroller 34's memory. The software may be programmed to perform the following functions: read values from and store values to microcontroller 34's memory; read the current level in phase coil 18 as indicated by the current indicative signal; control the generation of microcontroller control signals $S_1$ and $S_2$; initiate and terminate the counter in microcontroller 34; calculate an active phase time ratio from values obtained from the counter; compare the current level or the active phase time ratio to values stored in memory; and commutate the conduction cycle.

The operation of circuit 20 will now be described with reference to the flowchart in FIG. 3 and the timing and waveform diagrams in FIGS. 4A, 4B, and 4C. FIGS. 4A and 4B illustrate the control signals $S_1$ and $S_2$ generated by microcontroller 34 for opening and closing the first switching device 22 and the second switching device 24, respectively. FIG. 4C illustrates the change in current level in phase coil 18 as first switching device 22 and second switching device 24 are opened and closed.

The operation of circuit 20 provides a method for commutating a conduction cycle of a motor phase 16 of an SRM 10, wherein SRM 10 has first and second switching devices 22, 24 connected in series with a phase coil 18. First, as shown in step 38 of FIG. 3, a close-both-switches subroutine in software directs microcontroller 34 to close first switching device 22 and second switching device 24. As illustrated in FIGS. 4A and 4B, microcontroller 34 closes the switching devices by placing control signal $S_1$ and control signal $S_2$ in logic high states. The logic states, of course, depend on the switching devices 22, 24 selected—for example, if activelow devices were selected, a logic low would be operative to activate the respective switching devices. Closing the two switching devices initiates a conduction cycle in which phase coil 18 begins to conduct current sourced by power supply 26. Consequently, as shown in FIG. 4C, the current level in phase coil 18 begins to rise and eventually enters a predetermined current band represented by the dashed lines labeled $I_{MIN}$ and $I_{MAX}$. $I_{MIN}$ represents a local minimum level of the current level, while $I_{MAX}$ represents a local maximum level of the current level. $I_{MIN}$ and $I_{MAX}$ are predetermined values which may be preloaded into the memory of microcontroller 34 by software. Thus the means for closing first and second switching devices 22, 24 may comprise microcontroller 34 as configured by the close-both-switches subroutine responsive to information from current sensor 32.

Figure 3:
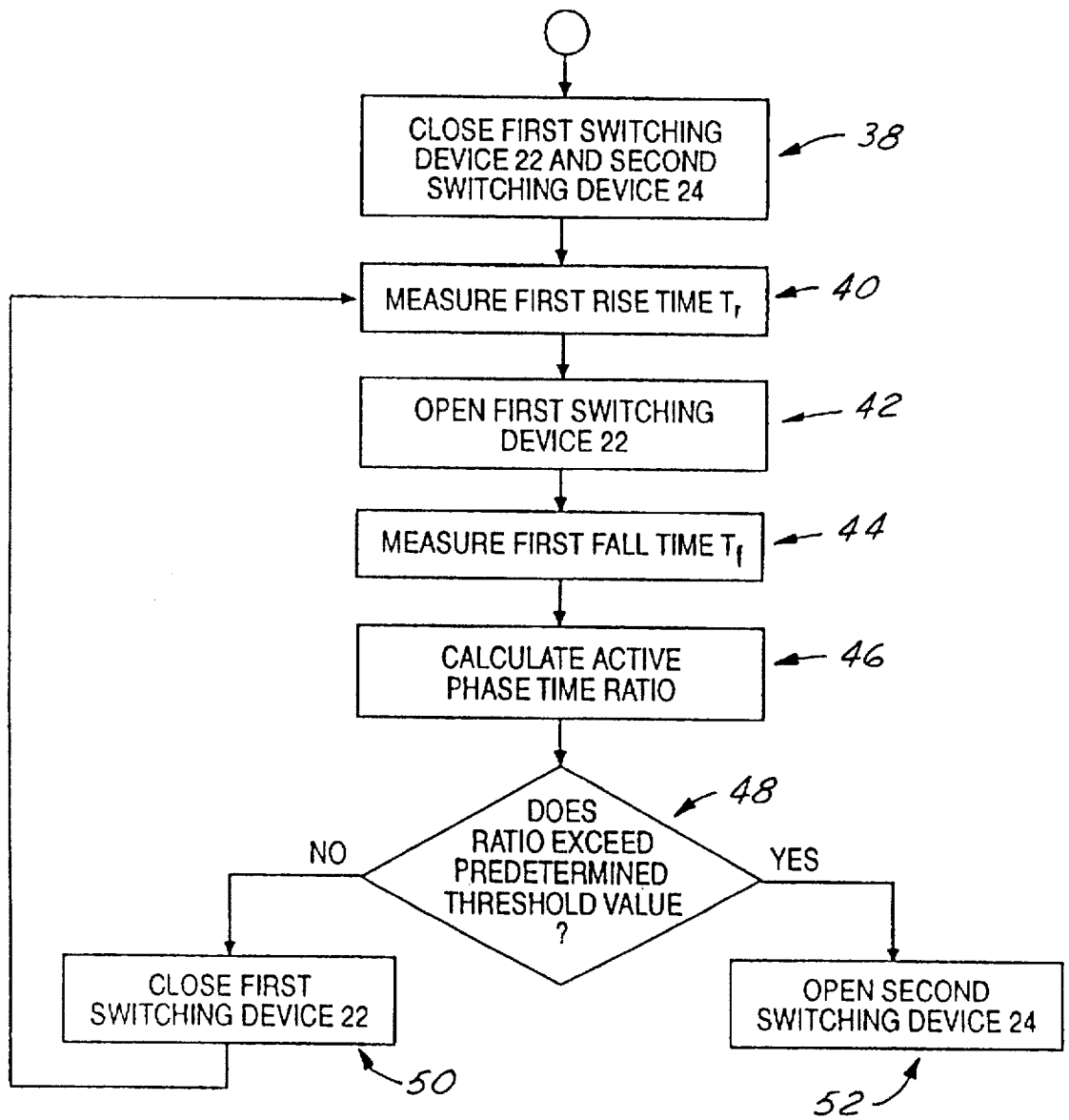
FIG. 3 is a simplified flowchart diagram illustrating steps for performing a method of commutating a conduction cycle of a motor phase according to the present invention.
Figure 4A:
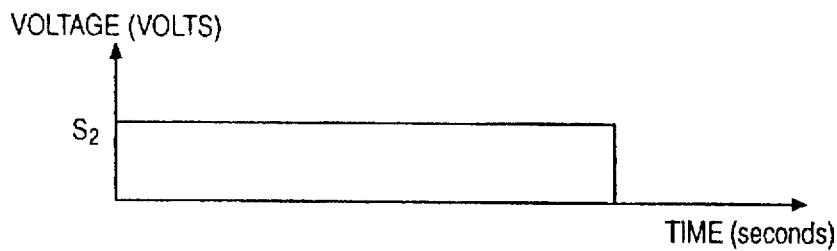
FIGS. 4A and 4B are simplified timing diagrams representing control signals generated by a microcontroller for directing a first switching device and a second switching device of the present invention.
Figure 4B:
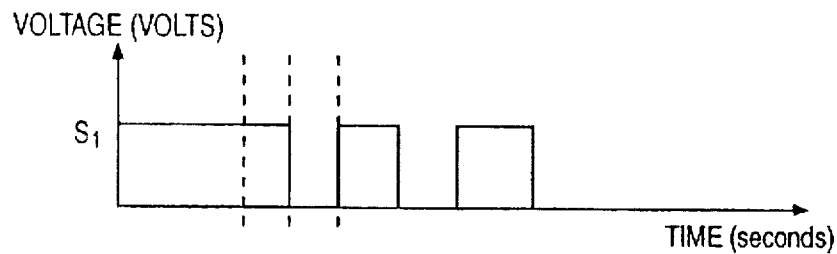
Figure 4C:
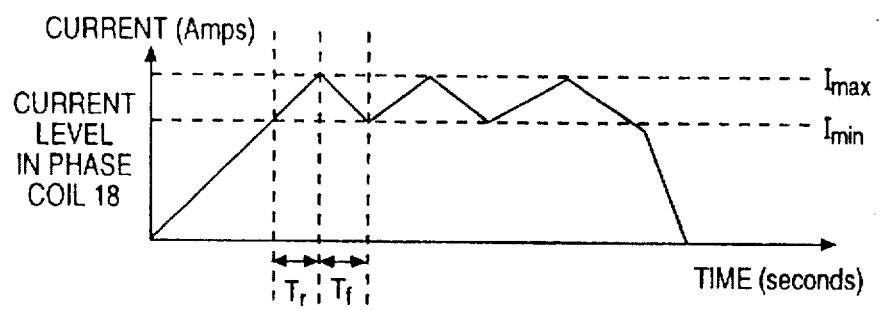
FIG. 4C is a simplified waveform diagram representing a current level through a phase coil, as a function of time, over a complete conduction cycle, controlled according to the present invention.

Second, as shown in step 40 of FIG. 3, a first rise time—$T_r$ in FIG. 4C—is measured by counting the time it takes the current level in phase coil 18 to rise from local minimum level $I_{MIN}$ to local maximum level $I_{MAX}$. A rise-time subroutine in software directs microcontroller 34 to read the current level from the current indicative signal produced by current sensor 32 and to repeatedly compare the current level to $I_{MIN}$. When the current level equals $I_{MIN}$, the subroutine initiates a counter. The subroutine then directs microcontroller 34 to read the current level once again and to repeatedly compare the current level to $I_{MAX}$. When the current level equals $I_{MAX}$, the subroutine terminates the counter and may direct microcontroller 34 to store the value indicated by the counter in memory. This value is equivalent to $T_r$. Thus the means for measuring a first rise time may comprise microcontroller 34 as configured by the rise-time subroutine responsive to information from current sensor 32.

Third, as shown in step 42 of FIG. 3, an open-one-switch subroutine in software directs microcontroller 34 to open first switching device 22 when the current indicative signal of current sensor 32 indicates that the current level in phase coil 18 has reached local maximum level $I_{MAX}$. As illustrated in FIG. 4B, microcontroller 34 opens first switching device 22 by changing control signal $S_1$ to a logic low state from the logic high state. This causes the current level in phase coil 18 to begin to fall as indicated in FIG. 4C.

Fourth, as shown in step 44 of FIG. 3, a first fall time—$T_f$ in FIG. 4C—is measured by counting the time it takes the current level in phase coil 18 to fall from local maximum level $I_{MAX}$ to local minimum level $I_{MIN}$. When the current indicative signal of current sensor 32 indicates that the current level has reached $I_{MAX}$, and the open-one-switch subroutine is complete, a fall-time subroutine in software initiates the counter in microcontroller 34. The subroutine then directs microcontroller 34 to read the current indicative signal and to repeatedly compare the value indicated by the current indicative signal to $I_{MIN}$. When the current level equals $I_{MIN}$, the subroutine terminates the counter and may direct microcontroller 34 to store the value indicated by the counter in memory. This value is equivalent to $T_f$. Thus, the means for measuring a first fall time may comprise microcontroller 34 as configured by the fall-time subroutine responsive to information from current sensor 32.

Fifth, as shown in step 46 of FIG. 3, a calculate-phase-ratio subroutine in software directs microcontroller 34 to calculate an active phase time ratio R using the first rise time and the first fall time. The active phase time ratio R is defined as $R=(T_r*T_f)/(T_r+T_f)$ where $T_r$ is the first rise time and $T_f$ is the first fall time. Thus, the subroutine directs microcontroller 34 to add $T_r$ and $T_f$ to obtain a denominator and directs microcontroller 34 to multiply $T_r$ and $T_f$ to obtain a numerator. The subroutine finally directs microcontroller 34 to divide the numerator by the denominator to obtain the active phase time ratio. The active phase time ratio can be used to indicate the level of inductance in phase coil 18, and, as an indirect sensing technique, the angular position of rotor 14 relative to a pair of stator poles. This relationship can be seen from the following equations which are derived from the theoretical approach developed in "New Commutation Methods in Switched Reluctance Motors Based on Active Phase Vectors," K. R. Ramani and M. Ehsani, 25th Annual IEEE Power Electronics Specialists Conference, Vol. 1, 1994, pp. 493–99 (20–25 Jun., 1994). First rise time $T_r$ and first fall time $T_f$ can be calculated as follows wherein L is the incremental inductance of phase coil 18, i is the current level in phase coil 18, V is the voltage supplied by power supply 26, R is the resistance of phase coil 18, $\Psi$ is the flux linkage of phase coil 18 and $\Theta$ 8 is the angular position of the rotor:

$$T_r=(L*\Delta i)/(V-(R*i)-(d\Psi/d\Theta*d\Theta/dt))$$

$$T_f=(L*\Delta i)/(Ri+(d\Psi/d\Theta*d\Theta/dt))$$

Combining the two equations gives the following relationship:

$$L=(V/\Delta i)*((T_r*T_f)/(T_r+T_f))$$

Because the ratio $(T_r*T_f)/(T_r+T_f)$ is proportional to the inductance L of phase coil 18, and inductance L can be used as a measurement of the angular position of rotor 14, the active phase time ratio can be used as an indirect sensor of the angular position of rotor 14. The means for calculating a value of an active phase time ratio may, therefore, comprise microcontroller 34 as configured by the calculate-phase-ratio subroutine.

Sixth, as shown in step 48 of FIG. 3, a compare-phase-ratio subroutine in software directs microcontroller 34 to compare the active phase time ratio to a predetermined threshold value which may be stored in the memory of microcontroller 34. In one embodiment of the invention, the predetermined threshold value corresponds to a preselected commutation angle associated with an angular position of rotor 14. In the preferred embodiment, the comparison is whether the active phase time ratio exceeds the predetermined threshold value. However, embodiments are contemplated where the relevant comparison is whether the active phase time ratio equals or is less than the predetermined threshold value and such embodiments should be considered within the scope of the present invention. That is, the magnitude of the predetermined threshold value can be numerically varied, arbitrarily, so that any number of different types of comparisons (e.g., less than, equal to, greater than) will result in commutation at the same, predetermined, rotor position.

If the active phase time ratio does not exceed the predetermined threshold value, then, as shown in step 50 of FIG. 3, a close-one-switch subroutine in software directs microcontroller 34 to close first switching device 22. As illustrated in FIG. 4B, microcontroller 34 closes first switching device 22 by changing control signal $S_1$ to a logic high state from the logic low state. This causes the current level in phase coil 18 to rise again as indicated in FIG. 4C. Once first switching device 22 has been closed, the subroutine directs microcontroller 34 to repeat steps 40 through 48. This results in a modulation of first switching device 22. Microcontroller 34 accomplishes this modulation by alternating control signal $S_1$ between the logic low state and the logic high state as illustrated in FIG. 4B. Repeating steps 40 through 48 also, therefore, causes the current level in phase coil 18 to oscillate between local minimum level $I_{MIN}$ and local maximum level $I_{MAX}$. This oscillation is shown in FIG. 4C. Thus, the means for modulating only a selected one of first and second switching devices 22, 24 may comprise microcontroller 34 as configured by the open-one-switch and close-one-switch subroutines responsive to information from current sensor 32.

If the active phase time ratio exceeds the predetermined threshold value, then the final step, step 52 of FIG. 3, occurs (i.e., commutation occurs). In step 52, an open-other-switch subroutine directs microcontroller 34 to open second switching device 24 by changing control signal $S_2$ to logic state low from logic state high—as illustrated in FIG. 4A. Because first switching device 22 is already open, this commutates the conduction cycle of motor phase 16. As shown in FIG. 4C, the current level in phase coil 18 quickly falls to a low value and remains low until the next conduction cycle for that motor phase 16. The process shown in FIG. 3 is then repeated in the next motor phase 16. The means for opening first and second switching devices 22, 24 may, therefore, comprise microcontroller 34 as configured by the open-one-switch and open-other-switch subroutines responsive to the information from current sensor 32.

Figure 5:
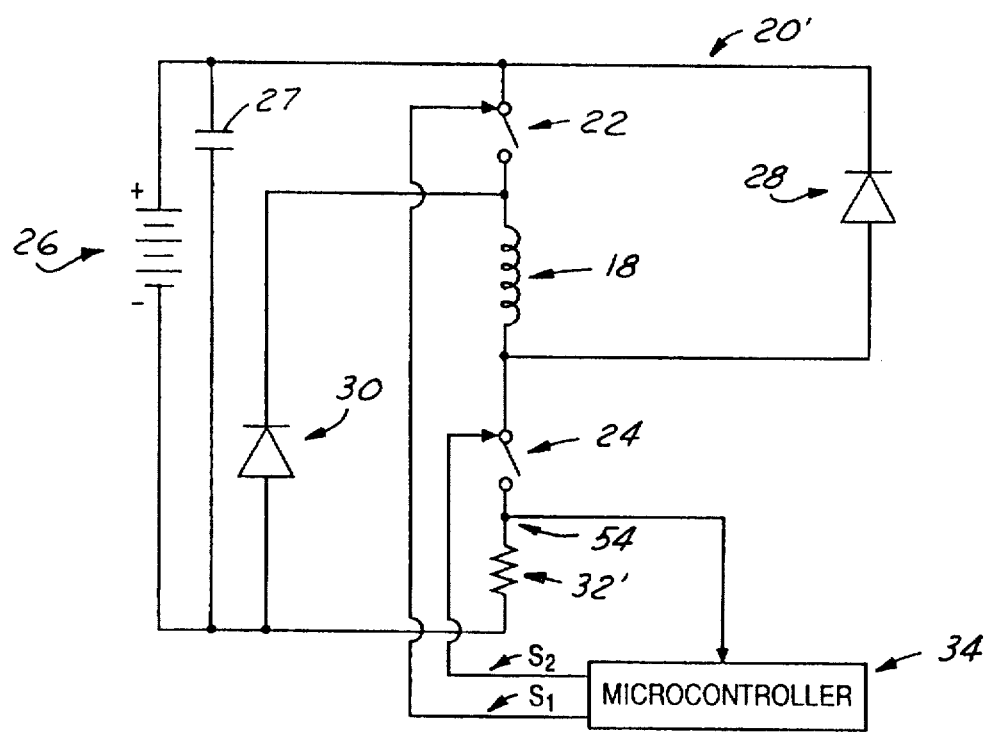
FIG. 5 is a simplified partial schematic and block diagram view of an alternative embodiment of one motor phase of a switched reluctance motor according to the present invention.

In FIG. 5, an alternative embodiment of circuit 20 is shown—circuit 20'. Circuit 20' is substantially similar to circuit 20 except that current sensor 32 is replaced by a resistive shunt 32'. Microcontroller 34 obtains a current indicative signal by measuring the voltage across shunt 32' (e.g., at a node 54 located between second switching device 24 and resistive shunt 32', which is referenced to ground). Those of ordinary skill in the art will recognize that current sensor 32' could also be located between first switching device 22 and phase coil 18 or between phase coil 18 and second switching device 24. Node 54 would then be located between first switching device 22 and resistive shunt 32' or between phase coil 18 and resistor shunt 32', respectively.

While the invention has been particularly shown and described with reference to the preferred embodiments thereof, it is well understood by those skilled in the art that various changes and modifications can be made in the invention without departing from the spirit and scope of the invention.

I claim:

1. A method for commutating a conduction cycle of a motor phase of a switched reluctance motor wherein said motor phase includes a first switching device and a second switching device both connected in series with a phase coil, said method comprising the steps of:

closing said first switching device and said second switching device to initiate said conduction cycle by causing a current to flow through said phase coil;

modulating only a selected one of said first and said second switching devices to control a level of said current between a local maximum level and a local minimum level;

measuring a first rise time for said current level to rise from said local minimum level to said local maximum level;

measuring a first fall time for said current level to fall from said local maximum level to said local minimum level;

calculating a value of an active phase time ratio using said first rise time and said first fall time; and, opening said first and said second switching devices when said active phase time ratio value reaches a predetermined threshold value to thereby commutate said conduction cycle.

2. The method according to claim 1, wherein said calculating step includes the substeps of:

adding said first rise time and said first fall time to obtain a denominator;

multiplying said first rise time and said first fall time to obtain a numerator; and dividing said numerator by said denominator to obtain said value of said active phase time ratio.

3. The method according to claim 1, further comprising the step of defining said predetermined threshold value to correspond to a preselected commutation angle associated with a rotor position of said motor.

4. A circuit for commutating a conduction cycle of a motor phase of a switched reluctance motor comprising:

a first switching device;

a second switching device connected in series with said first switching device;

a phase coil connected in series between said first switching device and said second switching device, said first and second switching devices connected in parallel to a power supply and provided for selectively adjusting a level of a current in said phase coil;

means for closing said first and said second switching devices to initiate a conduction cycle by causing said current to flow through said phase coil;

means for modulating only a selected one of said first and said second switching devices to control said current level between a local maximum level and a local minimum level;

means for measuring a first rise time for said current level to rise from said local minimum level to said local maximum level;

means for measuring a first fall time for said current level to fall from said local maximum level to said local minimum level;

means for calculating a value of an active phase time ratio using said first rise time and said first fall time; and, means for opening said first and said second switching devices when said active phase time ratio value reaches a predetermined threshold value to thereby commutate said conduction cycle.

5. The circuit of claim 4, further comprising a second motor phase.

6. The circuit of claim 4, wherein said active phase time ratio R is defined as $R=(T_r*T_f)/(T_r+T_f)$ where $T_r$ is said first rise time and $T_f$ is said first fall time.

7. The circuit of claim 4, wherein said predetermined threshold value corresponds to a preselected commutation angle associated with a rotor position of said motor.

8. The circuit of claim 4, further comprising a capacitor connected in parallel with a combination of said first switching device, said phase coil and said second switching device.

9. The circuit of claim 4, further comprising a first diode connected in parallel with a combination of said first switching device and said phase coil.

10. The circuit of claim 4, further comprising a second diode connected in parallel with a combination of said second switching device and said phase coil.

11. The circuit of claim 4, wherein said closing means, said modulating means, said measuring a first rise time means, said measuring a first fall time means, said calculating means and said opening means comprises a current sensor and a microcontroller responsive to said current sensor wherein said microcontroller is programmed with a first set of program steps.

12. The circuit of claim 11, wherein said current sensor comprises a Hall sensor.

13. The circuit of claim 11, wherein said current sensor comprises a resistive shunt.

14. A circuit for commutating a conduction cycle of a motor phase of a switched reluctance motor comprising:

a first switching device;

a second switching device connected in series with said first switching device;

a phase coil connected in series between said first switching device and said second switching device, said first and second switching devices connected in parallel to a power supply and provided for selectively adjusting a level of a current in said phase coil;

a current sensor for monitoring a current level through said phase coil; and a microcontroller responsive to said current sensor for modulating only a selected one of said first and said second switching devices to control a level of said current between a local minimum level and a local maximum level, and for commutating said conducting cycle when an active phase time ratio derived from a first rise time and a first fall time of said current level reaches a predetermined threshold, wherein said microcontroller is programmed with a first set of program steps.

15. The circuit of claim 14, wherein said active phase time ratio R is defined as $R=(T_r*T_f)/(T_r+T_f)$ where $T_r$ is said first rise time and $T_f$ is said first fall time.

16. The circuit of claim 14, wherein said current sensor comprises a Hall sensor.

17. The circuit of claim 14, wherein said current sensor comprises a resistive shunt.

* * * * *